United States Patent

Desprez-Le Goarant et al.

[11] Patent Number: 6,137,540
[45] Date of Patent: Oct. 24, 2000

[54] METHOD AND APPARATUS FOR CORRECTING COLOR DIFFERENCE SIGNALS

[75] Inventors: Yann Desprez-Le Goarant; Loo Kah Chua, both of Singapore, Singapore

[73] Assignee: STMicroelectronics Asia Pacific PTE Limited, Singapore, Singapore

[21] Appl. No.: 09/297,804

[22] PCT Filed: Sep. 29, 1997

[86] PCT No.: PCT/SG97/00047

§ 371 Date: Aug. 13, 1999

§ 102(e) Date: Aug. 13, 1999

[87] PCT Pub. No.: WO98/20683

PCT Pub. Date: May 14, 1998

[30] Foreign Application Priority Data

Nov. 6, 1996 [SG] Singapore .......................... 9611062-2

[51] Int. Cl.[7] ................................ H04N 9/64; H04N 5/21
[52] U.S. Cl. ............................ 348/631; 348/630; 348/649
[58] Field of Search .................................... 348/631, 630, 348/625, 649, 650; 358/518, 520; 382/167; H04N 5/21, 9/64

[56] References Cited

U.S. PATENT DOCUMENTS 4,757,373  7/1988  Van Rooy ................................ 358/37
4,831,434  5/1989  Fuchsberger ............................ 358/80
5,068,718  11/1991  Iwabe et al. ............................ 358/27

FOREIGN PATENT DOCUMENTS 09301061  8/1995  Belgium .
0 414 183 A2  2/1991  European Pat. Off. .
0 467 602 A2  1/1992  European Pat. Off. .
0 470 579 A2  2/1992  European Pat. Off. .
38 09 303 A1  10/1989  Germany .

*Primary Examiner*—Sherrie Hsia
*Attorney, Agent, or Firm*—Theodore E. Galanthay, Esq.; David V. Carlson, Esq.; Seed IP Law Group, PLLC

[57] ABSTRACT

This invention relates to the color matching function used in connection with the luminance or white stretch function in a television video processor. Automatic adjustment in the amplitude of the color difference signals is provided to compensate for the effect of the stretch of the luminance signal in a provision called color matching. The general principal of color matching being, any percentage change in the amplitude of the luminance signal due to the white stretch effect, must be balanced by the same percentage changes in the color difference signal so that the ratio of the color signals can be maintained after matrixing. This accomplished by compensating the color difference signals by a varying amount that decreases with increasing the input luminance signal level when the level of the input luminance signal is above said selected threshold.

16 Claims, 2 Drawing Sheets

METHOD AND APPARATUS FOR CORRECTING COLOR DIFFERENCE SIGNALS

FIELD OF THE INVENTION

This invention relates to colour television video processors utilising a luminance stretch function. More particularly, the invention relates to the colour matching function used in connection with the luminance or white stretch function in a television video processor.

BACKGROUND ART

With the use of a luminance or white stretch function in a television video processor as part of a picture enhancement feature, there arises a need to provide some automatic adjustment in the amplitude of the colour difference signals to compensate for the effect of the stretch of the luminance signal. If compensation is not provided then the dematrixed colour signals will be incorrect and the picture will appear de-saturated. The provision of this compensation is called colour matching. The general principle of colour matching is that any percentage change in the amplitude of the luminanc signal due to the white stretch effect, must be balanced by the same percentage changes in the colour difference signal so that the ratio of the colour signals (R G B signals) can be maintained after matrixing. Existing circuits provide a compensation for the colour difference signals, however, the performance is only satisfactory for a luminance level below 50IRE and tends to over compensate above this level.

DISCLOSURE OF THE INVENTION

It is an object of this invention to provide an improved method and apparatus for correcting colour difference signals, which will overcome the limitations of the prior art.

Throughout the following description and claims use of the words "compensation" and "compensating" in relation to colour difference signal is to be taken as meaning application of an additional gain factor to the relevant signal.

Accordingly, in one aspect this invention provides a method of correcting colour difference signals in a colour television video processor utilising a luminance stretch function; said method comprising the steps of detecting the level of the input luminance signal; compensating the colour difference signals by a fixed amount when the level of the input luminance signal is below a selected input luminance threshold and compensating the colour difference signals by a varying amount that decreases with increasing input luminance signal level when the level of the input luminance signal is above said selected threshold.

In a second aspect, this invention also provides an apparatus for correcting colour difference signals in a colour television video processor utilising a luminance stretch function, said apparatus comprising means to detect the level of the input luminance signal; and means to apply a substantially constant amount of compensation to the colour difference signals when the level of the input luminance signal is below a selected input luminance threshold and to apply a varying of compensation to the colour difference signals that decreases with increasing input lumiance signal level when the level of the input luminance signal is above said selected threshold.

Preferably, the amount of compensation decreases linearly with increasing input luminance signal level. It is also preferred that the amount of compensation is reduced to zero at AND above a selected maximum luminance signal level. The maximum luminance level is preferably about 100IRE.

In the preferred embodiment, the input luminance threshold corresponds to the maximum luminance stretch of said video processor. Typically, this corresponds to a threshold luminance signal level of about 50IRE.

In one form of the invention, the input luminance signal is compared to a reference signal correponding to the input luminance threshold to determine whether the input luminance signal level exceeds the input luminance threshold.

The invention is preferably applied to an existing video processor providing a constant compensation for the colour difference signals by applying a correction to adjust the amount of compensation.

BEST MODE FOR CARRYING OUT THE INVENTION

One embodiment of the invention will now be described, by way of example only, with reference to the accompanying drawings in which.

Figure 1:
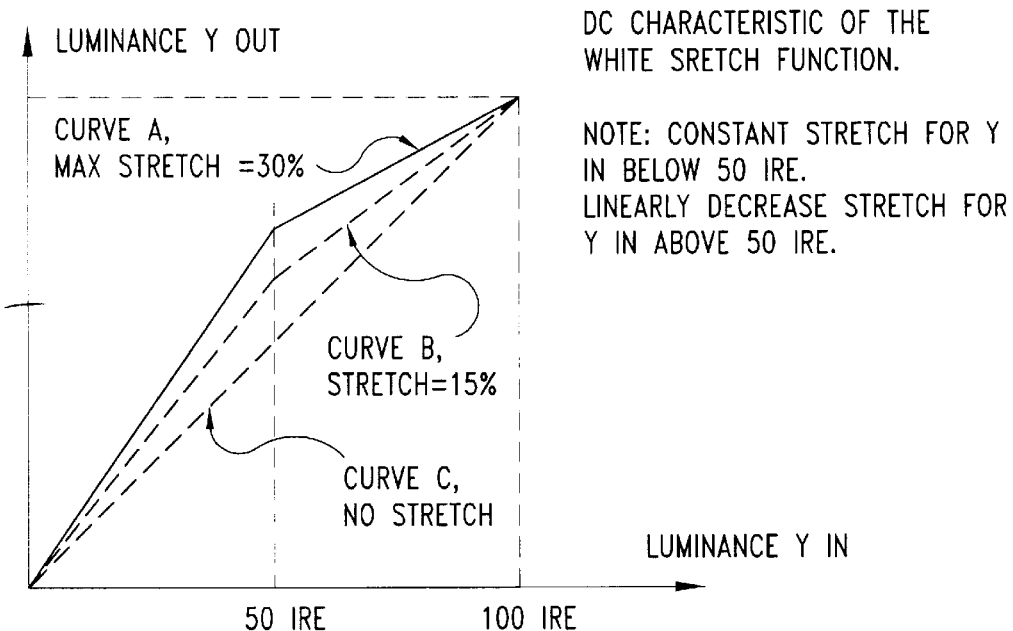
FIG. 1 is a plot of the DC characteristics of the white stretch function used in a television video processor.

As shown in FIG. 1, the white stretch function of a television video processor is characterised by a constant stretch of the input luminance below 50IRE and a linear decrease of the stretch for input luminance above 50IRE.

Figure 2:
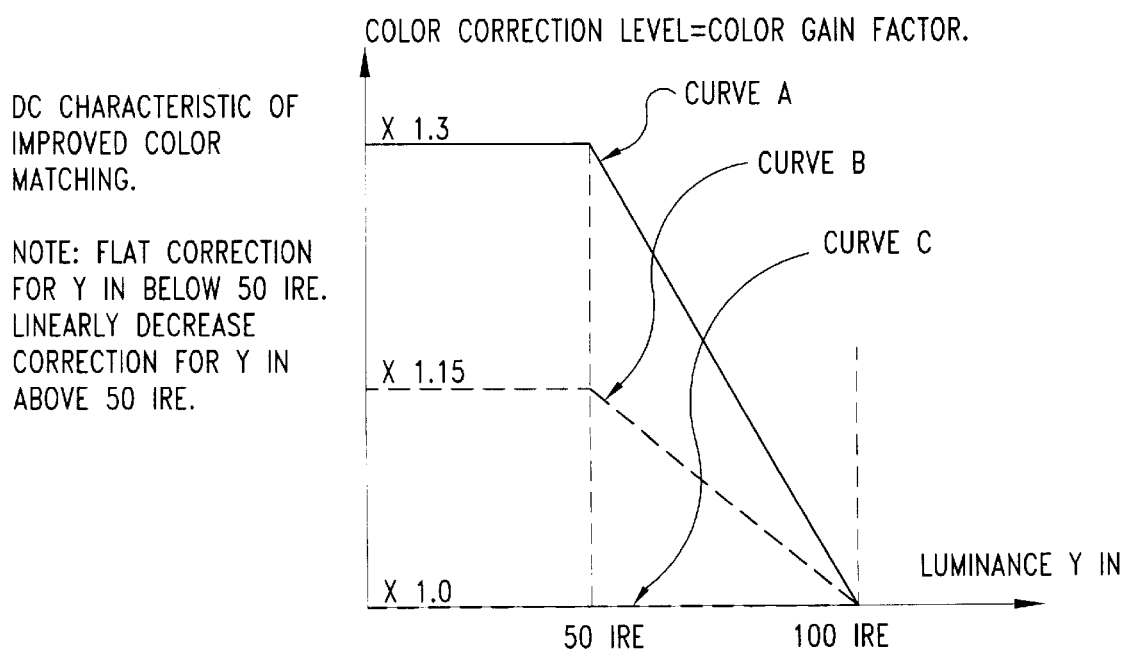
FIG. 2 is a plot of the DC characteristics of the compensation applied to the colour difference signals according to this invention.

FIG. 2 shows the DC compensation characteristic according to the preferred embodiment of this invention. A constant correction level is applied to the colour difference signals where the input luminance is below 50IRE and the amount of compensation decreases linerly when the input luminance is above 50IRE until it reaches a zero correction at 100IRE.

Figure 3:
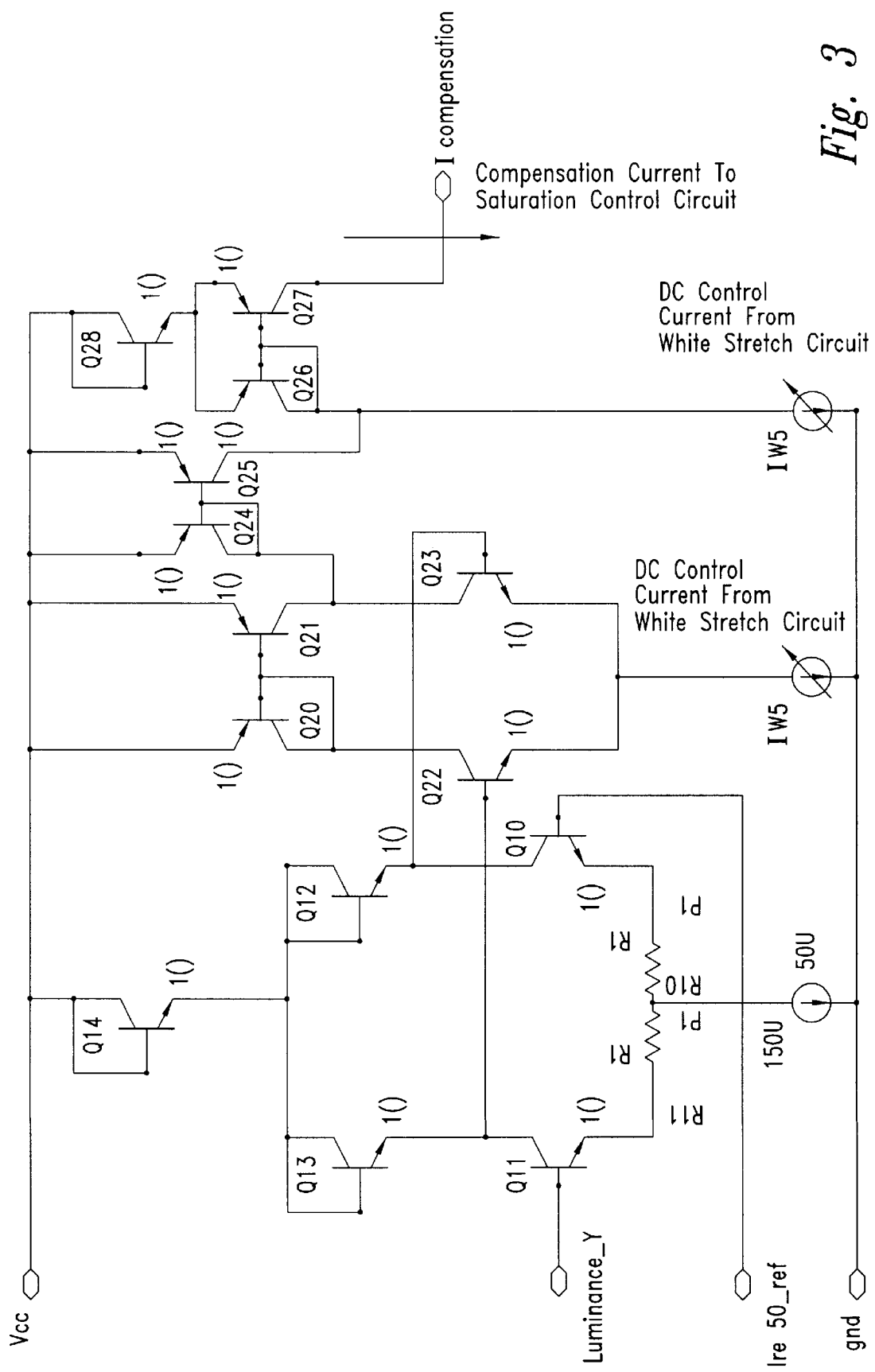
FIG. 3 is a simplified schematic circuit diagram of the circuit used to implement the compensation of the colour difference signals according to this invention.

Referring to FIG. 3, the compensation of the colour difference signals is achieved by adjusting the gain of the saturation control of the television video processor. This in turn changes the colour difference signal levels (R-Y, and B-Y). In the preferred embodiment of this invention, a compensation current is generated and applied to the saturation control circuit.

As will be apparent from FIG. 3, the luminance input signal level is detected and compared to a 50IRE reference voltage. The circuit operates such that the compensation is at a maximum for when the input luminance signal is less than 50IRE and linearly decreases to zero as the input luminance signal increases from 50IRE to 100IRE. The circuit utilises the variable DC control current ($I_{ws}$) depending on the amount of white stretch from an existing white stretch circuit (not shown) and provides this level of output compensation current to the saturation control circuit when the input luminance is below 50IRE and linearly decreases this control current to zero for luminance signals between 50IRE and 100IRE. The circuit utilises a voltage to current converter formed by transistor pair Q22, Q23 with an active PNP load Q20, Q21, a transistor pair Q10, Q11 and current mirrors. In operation:

$I_eQ27 = I_{ws} - I_eQ24$ $I_eQ24 = 0$ to $I_{ws}$ therefore $I_eQ27 = I_{ws}$ to $0 = I_{compensation}$ thus $$\text{when } Y_{in} \leq 50\text{IRE}, I_{compensation} = I_{ws}$$

$$\text{when } 50\text{IRE} < Y_{in} \leq 100\text{IRE}, I_{compensation} = I_{ws} \text{ to } 0 \text{ linearly}$$

$$\text{when } Y_{in} > 100\text{IRE} \; I_{compensation} = 0$$

The correction of colour difference signals according to this invention provides for improved colour matching over the whole of the input luminance range thus ensuring correct colour matching.

The foregoing describes only one embodiment of this invention and modifications can be made without departing from the scope of the invention.

What is claimed is:

1. A method of correcting colour difference signals in a coulour television video processor utilising a luminance stretch function; said method comprising the steps of detecting the level of an input luminance signal; applying a constant amount of compensation to the colour difference signals by a fixed amount when the level of the input luminance signal is below a selected input luminance threshold and compensating the colour difference signals by a varying amount that decreases with increasing the input luminance signal level when the level of the input luminance signal is above said selected threshold.

2. A method as claimed in claim 1, wherein amount of compensation decreases linearly with increasing the input luminance signal level.

3. A method as claimed in claim 1, wherein amount of compensation is reduced to zero at and above a selected maximum luminance signal level.

4. A method as claimed in claim 3, wherein said maximum luminance level is about 100IRE.

5. A method as claimed in claim 1, wherein said input luminance threshold corresponds to the maximum luminance stretch of said video processor.

6. A method as claimed in claim 1, wherein said selected input luminance threshold is about 50IRE.

7. A method as claimed in claim 1, wherein said input luminance signal is compared to a reference signal corresponding to said input luminance threshold to determine whether the input luminance signal level exceeds the input luminance threshold.

8. A method as claimed in claim 1, wherein said video processor provides a constant compensation for said colour difference signals and a correction is applied to adjust the amount of compensation.

9. An apparatus for correcting colour difference signals in a coulour television video processor utilising a luminance stretch function, said apparatus comprising means to detect the level of an input luminance signal; and means to apply a substantially fixed compensation to the colour difference signals when the level of the input luminance signal is below a selected input luminance threshold and to apply a varying compensation to the colour difference signals that decreases with increasing the input luminance signal level when the level of the input luminance signal is above said selected threshold.

10. An apparatus as claimed in claim 9, wherein amount of compensation decreases linearly with increasing the input luminance signal level.

11. An apparatus as claimed in claim 9, wherein amount of compensation is reduced to zero at and above a selected maximum luminance signal level.

12. An apparatus as claimed in claim 11, wherein said maximum luminance level is about 100IRE.

13. An apparatus as claimed in claim 9, wherein said input luminance threshold corresponds to the maximum luminance stretch of said video processor.

14. An apparatus as claimed in claim 9, wherein said selected input luminance threshold is about 50IRE.

15. An apparatus as claimed in claim 9, wherein said input luminance signal is compared to a reference signal corresponding to said input luminance threshold to determine whether the input luminance signal level exceeds the input luminance threshold.

16. An apparatus as claimed in claim 9, wherein said video processor provides a constant compensation for said colour difference signals and a correction is applied to adjust the amount of compensation.

* * * * *